(12) United States Patent
Cho et al.

(10) Patent No.: US 11,515,681 B2
(45) Date of Patent: Nov. 29, 2022

(54) LASER MODULE AND LASER SYSTEM INCLUDING THE SAME

(71) Applicant: ELECTRONICS AND TELECOMMUNICATIONS RESEARCH INSTITUTE, Daejeon (KR)

(72) Inventors: Won Bae Cho, Daejeon (KR); Moon Youn Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 730 days.

(21) Appl. No.: 16/509,860

(22) Filed: Jul. 12, 2019

(65) Prior Publication Data

US 2020/0021075 A1 Jan. 16, 2020

(30) Foreign Application Priority Data

Jul. 12, 2018 (KR) .................. 10-2018-0081292
Jul. 9, 2019 (KR) .................. 10-2019-0082686

(51) Int. Cl.
*H01S 3/00* (2006.01)
*G02B 26/08* (2006.01)
(Continued)

(52) U.S. Cl.
CPC ........ *H01S 3/0057* (2013.01); *G02B 26/0816* (2013.01); *G02B 27/0944* (2013.01); *G02B 27/0955* (2013.01); *G02B 27/0977* (2013.01); *H01S 3/0071* (2013.01); *H01S 3/0085* (2013.01); *H01S 3/2308* (2013.01); *H01S 3/1618* (2013.01)

(58) Field of Classification Search
CPC .............. H01S 3/0057; G02B 26/0816; G02B 26/0833
See application file for complete search history.

(56) References Cited

U.S. PATENT DOCUMENTS 4,759,628 A * 7/1988 Tatsuno .................... G01J 9/04
356/489
7,274,718 B2 * 9/2007 Tan ........................ G02F 1/113
348/E9.026
(Continued)

FOREIGN PATENT DOCUMENTS

JP 2013077831 A 4/2013
KR 20030020110 A 3/2003
KR 101833860 B1 3/2018

*Primary Examiner* — Eric L Bolda (57) ABSTRACT

Provided is a laser module that receives a first laser beam and outputs a second laser beam different from the first laser beam, the laser module including an optical system configured to modulate the first laser beam into the second laser beam and output the second laser beam, a first mirror disposed on an optical path of the first or second laser beam defined in the laser module, the first mirror reflecting the first laser beam to the optical system, a first sensor disposed adjacent to the first mirror and configured to sense the first laser beam incident to the first mirror, a second mirror disposed on the optical path to reflect the second laser beam to an outside of the laser module, and a first driver connected to the second mirror and configured to rotate the second mirror.

18 Claims, 10 Drawing Sheets

(51) Int. Cl.
  *G02B 27/09* (2006.01)
  *H01S 3/23* (2006.01)
  *H01S 3/16* (2006.01)

(56) References Cited

U.S. PATENT DOCUMENTS

| | | |
|---|---|---|
| 7,711,013 B2 | 5/2010 | Liu et al. |
| 9,795,512 B2 | 10/2017 | Cherkas et al. |
| 9,905,987 B2 | 2/2018 | Seo et al. |
| 10,379,042 B2* | 8/2019 | Ideguchi ................ G02B 26/06 |
| 2018/0019141 A1* | 1/2018 | Ohkubo ............ H01L 21/67115 |
| 2018/0083407 A1 | 3/2018 | Song et al. |

* cited by examiner

LASER MODULE AND LASER SYSTEM INCLUDING THE SAME

CROSS-REFERENCE TO RELATED APPLICATIONS

This U.S. non-provisional patent application claims priority under 35 U.S.C. § 119 of Korean Patent Application No. 10-2018-0081292, filed on Jul. 12, 2018, and 10-2019-0082686, filed on Jul. 9, 2019, the entire contents of which are hereby incorporated by reference.

BACKGROUND

The present disclosure herein relates to a laser module and a laser system including the same, and more particularly, to a laser module including an optical system that outputs a laser beam, and a laser system including the same.

A laser beam is formed by using light amplification by the stimulated emission of radiation, and has characteristics of mono-chromaticity, directionality, and high brightness. The laser system has been developed so that a laser beam having a high output may be oscillated according to demands in various industrial fields. An efficient method for improving an output of a laser beam is to oscillate a laser beam in a pulse type. In order to make a laser beam of a pulse type, technologies such as Q switching or mode-locking have been developed. Furthermore, as a method for further raising energy of a pulse, a method for amplifying pulse energy or the like through an additional optical system has been developed. A laser system for oscillating a high output laser beam has a plurality of optical systems. As the number of optical systems increases in a laser system, researches are required for facilitating optical alignment between the optical systems.

SUMMARY

The present disclosure provides a modularized laser system and a laser module therefor.

An embodiment of the inventive concept provides a laser module, which receives a first laser beam and outputs a second laser beam different from the first laser beam, the laser module including: an optical system configured to modulate the first laser beam into the second laser beam and output the second laser beam; a first mirror disposed on an optical path of the first or second laser beam defined in the laser module, the first mirror reflecting the first laser beam to the optical system; a first sensor disposed adjacent to the first mirror and configured to sense the first laser beam incident to the first mirror; a second mirror disposed on the optical path to reflect the second laser beam to an outside of the laser module; and a first driver connected to the second mirror and configured to rotate the second mirror.

In an embodiment, the optical system may include at least one among a pulse stretcher, an amplifier, or a pulse compressor.

In an embodiment, the second laser beam may be different from the first laser module in at least one among a pulse width, a pulse spectrum, intensity, or a polarization direction.

In an embodiment, the laser module may further include a control unit connected to the first sensor and configured to receive a sensing signal for the first laser beam from the first sensor to generate a driving signal.

In an embodiment, the laser module may further include: a first terminal connected to the control unit; and a second terminal connected to the first driver.

In an embodiment, the first mirror may include a semi-transmissive mirror, and the first sensor includes a charge-coupled element configured to sense the first laser beam penetrating through the first mirror.

In an embodiment, the laser module may further include a second driver connected to the first mirror and configured to rotate the first mirror.

In an embodiment, the laser module may further include: a third mirror disposed behind the first mirror on the optical path; and a second sensor disposed adjacent to the third mirror to sense the first laser beam incident to the third mirror.

In an embodiment, the laser module may further include: a second driver connected to the first mirror and configured to rotate the first mirror; a third mirror disposed behind the first mirror on the optical path; a second sensor disposed adjacent to the third mirror and configured to sense the first laser beam incident to the third mirror; and a control unit configured to receive a sensing signal for the first laser beam from the second sensor and provide the second driver with a driving signal.

In an embodiment of the inventive concept, a laser system includes: a first laser module; and a second laser module configured to receive a laser beam from the first laser module, wherein the first laser module includes: a first optical system configured to output a first laser beam; a first mirror configured to reflect the first laser beam to the second laser module; and a first driver coupled to the first mirror so as to rotate the first mirror, and wherein the second laser module includes: a second optical system configured to receive the first laser beam and output a second laser beam different from the first laser beam; a second mirror configured to reflect the first laser beam towards the second optical system; and a sensor disposed adjacent to the second mirror and configured to sense the second laser beam incident to the second mirror.

In an embodiment, the second laser module may further include a control unit connected to the sensor and the first driver.

In an embodiment, the control unit may be configured to receive a sensing signal for the first laser beam from the sensor to thereby provide the first driver with a driving signal.

In an embodiment, the sensing signal may include at least one among information on whether the second mirror is irradiated with the first laser beam and information on a position at which the first laser beam is irradiated on a third mirror.

In an embodiment, the first optical system may include at least one among an oscillator, a pulse stretcher, an amplifier, or a pulse compressor.

In an embodiment, the second laser beam may be different from the first laser beam in at least one among a pulse width, a pulse spectrum, intensity or a polarization direction.

In an embodiment, the second laser module may include a third mirror configured to reflect the second laser beam to an outside of the second module and a second driver coupled to the third mirror so as to rotate the third mirror.

In an embodiment, the second mirror may include a semi-transmissive mirror, and the sensor includes a charge-coupled element configured to sense the first laser beam penetrating through the second mirror.

In an embodiment, the first laser module may include a first terminal connected to the first driver, the second laser module may include a control unit connected to the first driver and a second terminal connected to the control unit, and the first terminal and the second terminal may be connected to each other so as to connect the control unit and the first driver.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims. Throughout this specification, like numerals refer to like elements.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Moreover, exemplary embodiments will be described herein with reference to cross-sectional views and/or plane views that are idealized exemplary illustrations. In the drawings, the thickness of layers and regions are exaggerated for effective description of the technical details. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching area shown with a right angle may be formed in a round form or in a form having a prescribed curvature. Thus, the regions illustrated in the figures are schematic in nature and their shapes may be not intended to illustrate the actual shape of a region of a device and are not intended to limit the scope of example embodiments.

Hereinafter, a laser system and a laser module according to embodiments of the inventive concept will be specifically described with reference to the drawings.

Figure 1:
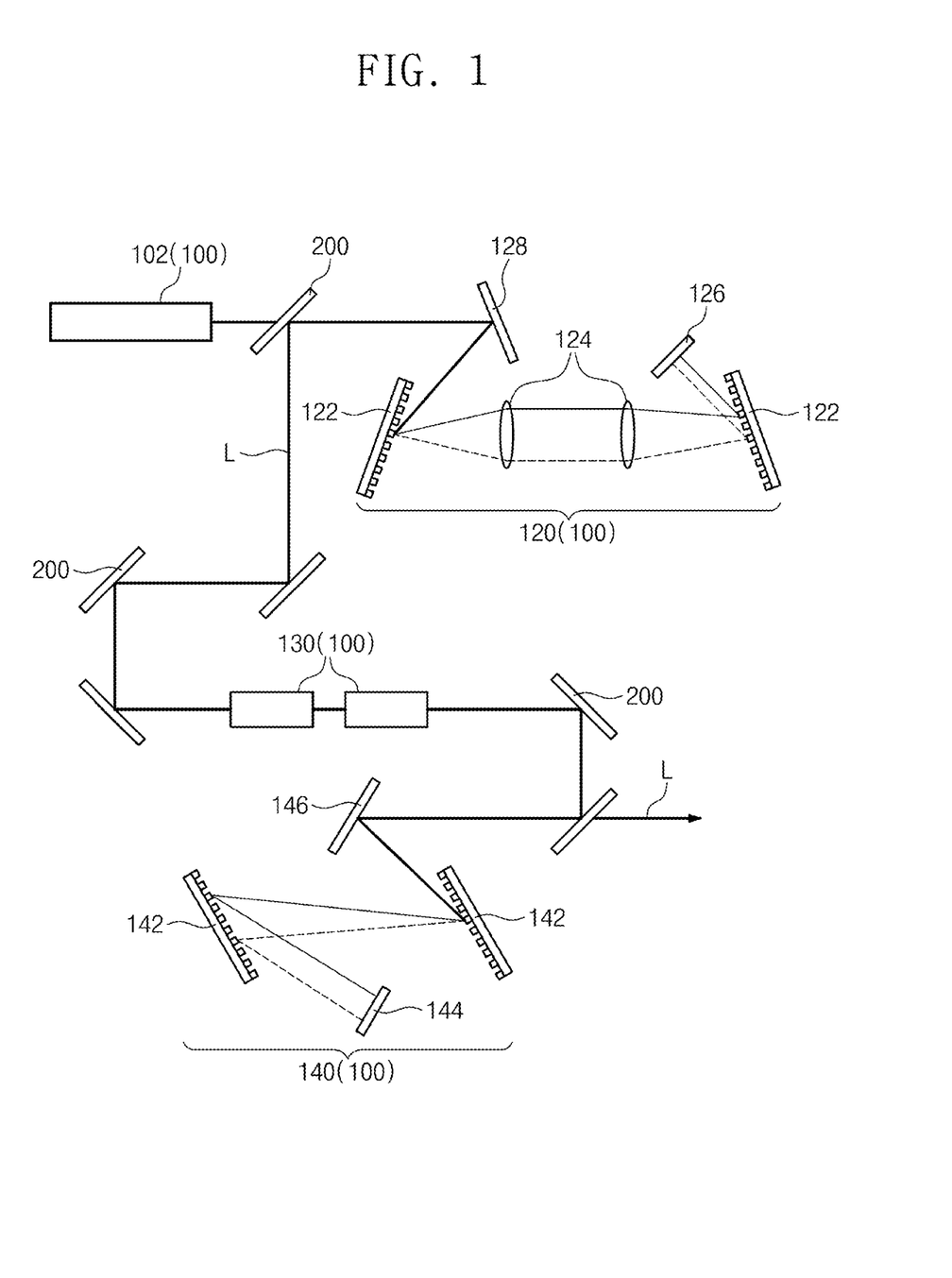
FIG. 1 is a schematic diagram illustrating a laser system according to an embodiment of the inventive concept.

FIG. 1 is a schematic diagram illustrating a laser system according to an embodiment of the inventive concept.

Referring to FIG. 1, a laser system of the inventive concept may include a plurality of optical systems 100 and mirrors 200. Each of the optical systems 100 may an optical functional unit body that generates a laser beam L, or receives and modulates a laser beam L to output the modulated result. The optical systems 100 according to embodiments of the inventive concept may be arrayed along an optical path so that a laser beam L of a high output may be oscillated at an output stage of the laser system.

The optical systems 100 may be optically connected by the mirrors 200. The mirrors 200 may be positioned on the optical path to reflect the laser beam L. For example, angles of the mirrors 200 may be adjusted so that the laser beam is focused onto a target position in each optical system 100. Some mirrors 200 may include semi-transmissive mirrors so that a laser beam may be reflected thereby and transmitted therethrough.

According to embodiments, the laser system may be a laser system using chirped pulse amplification (CPA). For example, the optical systems 100 of the laser system may include an oscillator 102, a pulse stretcher 120, an amplifier 130, and a pulse compressor 140. Hereinafter, in order to facilitate explanation for the laser system and the optical system 100, embodiments of the inventive concept will be described around the laser system using the chirped pulse amplification. However, the laser system of the inventive concept is not limited to the laser system using the chirped pulse amplification.

The oscillator 102 may include a laser device that generates a laser beam using mode locking. The laser system according to embodiments of the inventive concept may be a femtosecond laser system, and the oscillator 102 may generate an ultra short pulse in a femtosecond region. The oscillator 102 may include an optical fiber laser device or a solid laser device. A gain medium used in the solid laser device may include various materials according to thermal, optical, or mechanical characteristics. For example, the gain medium may include an amorphous medium or a crystal medium. The crystal medium may include, for example, an isotropic crystal or an anisotropic crystal. The anisotropic crystal may include a uniaxial crystal or a biaxial crystal.

For example, the amorphous medium may include Yb:Glass, and the isotropic tropic in the crystal medium may include at least any one among Yb:YAG, Yb:ScO, Yb:YO, Yb:LuO, Yb:LuScO, or Yb:CaF. For example, the uniaxial crystal may include at least any one among Yb:CALGO, Yb:YVO4, Yb:NGW, Yb:NYW, Yb:LuVO, Yb:LSB, Yb:S-FAP, or Yb:C-FAP, and the biaxial crystal may include at least any one among Yb:KYW, Yb:KGW, Yb:KLuW, Yb:Y-COB, or Yb:YAP.

The pulse stretcher may be disposed behind the oscillator 102 and before the amplifier 130 on the optical path. The pulse stretcher 120 may increase a pulse width of the laser beam L to prevent a physical damage from occurring to an optical component such as a laser medium during amplification of the laser beam L. The pulse stretcher 120 may increase a pulse width of femtoseconds to a pulse width of picoseconds or nanoseconds. The pulse stretcher 120 may include, for example, an offner-triplet type reflective optical system. The pulse stretcher 120 may include first diffraction gratings 122, convex lenses 124, a first reflector 126, and a first input and output mirror 128.

The first diffraction gratings 122 may be disposed to face each other in parallel or antiparallel manner. The first diffraction gratings 122 may diffract the laser beam L. The first diffraction gratings 122 may determine an increase amount of the pulse width of the laser beam L. The convex lenses 124 may focus the laser beam L on each of the first diffraction gratings 122. The laser beams L between the convex lenses 124 may be parallel. The first reflector 126 may reflect the laser beam L diffracted from one among the first diffraction gratings 122. The first reflector 126 may include, for example, a concave mirror. Here, the concave mirror may have a larger radius of curvature than the convex lenses 124. The first input and output mirror 128 may reflect the laser beam L towards the first diffraction gratings 122 from the oscillator 102, and reflect again the laser beam L towards the amplifier 130 from the first diffraction gratings 122.

Like the oscillator 102, the amplifier 130 may include a laser beam generating device using an optical fiber laser or a solid laser. The amplifier 130 may increase the intensity of the laser beam L.

The amplifier 130 may amplify the laser beam L provided from the pulse stretcher 120 to generate the laser beam L having high output. The amplifier 130 may include the same gain medium as the oscillator 102 or include a different gain medium. In other words, the gain media used in the oscillator 102 and the amplifier 130 may be formed of a combination of a crystal medium and an amorphous medium. When the gain media used in the oscillator 102 and the amplifier 130 are both the crystal media, the gain media used in the oscillator 102 and the amplifier 130 may be formed of a combination of an isotropic crystal and an anisotropic crystal. A specific type of the gain medium usable in the amplifier 170 may be the same as or similar to a laser medium usable in the oscillator 102.

The pulse compressor 140 may reduce the pulse width of the laser beam L. The pulse compressor 140 may output the laser beam L of femtoseconds. For example, the pulse compressor 140 may include a plurality of second diffraction gratings 142, a second reflector 144, and a second input and output mirror 146. The second diffraction gratings 142 may have a smaller grating interval than the first diffraction gratings 122. The second input and output mirror 146 may reflect the laser beam L to the second diffraction gratings 142. The second diffraction gratings 142 and the second reflector 144 may reduce the pulse width of the laser beam L. The laser beam L, the pulse width of which is reduced in the pulse compressor 140, may be output to the output stage of the laser system. According to an example, the pulse compressor 140 may simultaneously perform the function of the pulse stretcher 120. In other words, the pulse compressor 140 may form one optical system 100 together with the pulse stretcher 120.

Although not shown, as the optical system 100, the laser system may further include, a Faraday isolator, a spectral shaper, or the like. The Faraday isolator may prevent a pulse of high energy, which is generated from the amplifier 130, from being incident to the oscillator 102. The spectrum shaper may deform the spectrum of the laser beam L, a pulse width of which has been stretched in the pulse stretcher 120, so as to compensate the spectrum bandwidth for being narrowed in the process in which the laser beam L is amplified.

Figure 2A:
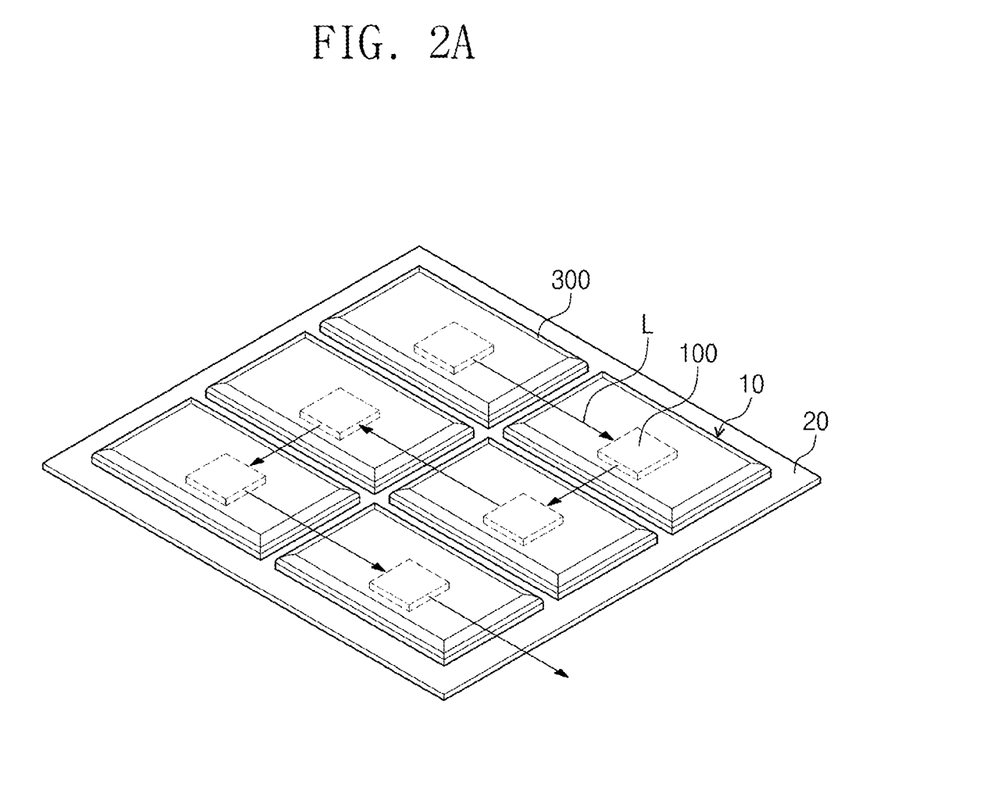
FIGS. 2A and 2B are perspective views for explaining a laser system according to embodiments of the inventive concept.
Figure 2B:
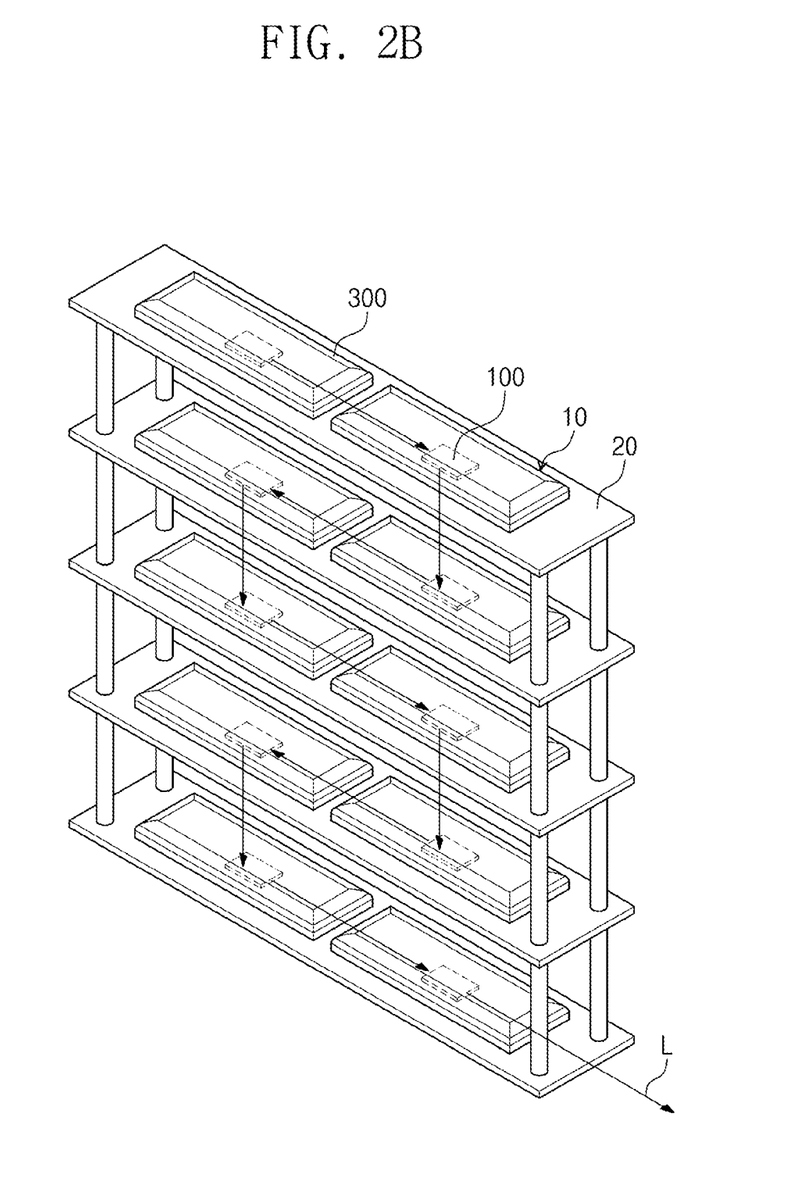

FIGS. 2A and 2B are perspective views for explaining a laser system according to embodiments of the inventive concept.

Referring to FIGS. 2A and 2B, the laser system according to the embodiments of the inventive concept may include a plurality of laser modules 10 disposed on an optical table 20. Each of the laser modules 10 may include at least one optical system 100. Furthermore, each of the laser modules 10 may include a housing 200 surrounding the optical system 100. The optical systems 100 in different laser modules 10 may be optically coupled to each other. In other words, the optical systems 100 in different laser modules 10 may be arrayed along an optical path of a laser beam in the laser system, or may output one high output laser beam L. As an example, the laser modules 10 and the optical systems 100 may be arrayed two-dimensionally as shown in FIG. 2A. As another example, the laser modules 10 and the optical systems 100 may be arrayed three-dimensionally as shown in FIG. 2B.

The laser system according to the embodiments of the inventive concept may be a large laser system. For example, the laser system may oscillate a laser beam having an output equal to or greater than terawatts and a pulse width equal to or smaller than femtoseconds. Accordingly, the laser system is modularized to improve space utilization efficiency. In addition, since the laser modules 10 in the laser system are possibly divided, the maintenance of the laser system may be facilitated.

Figure 3:
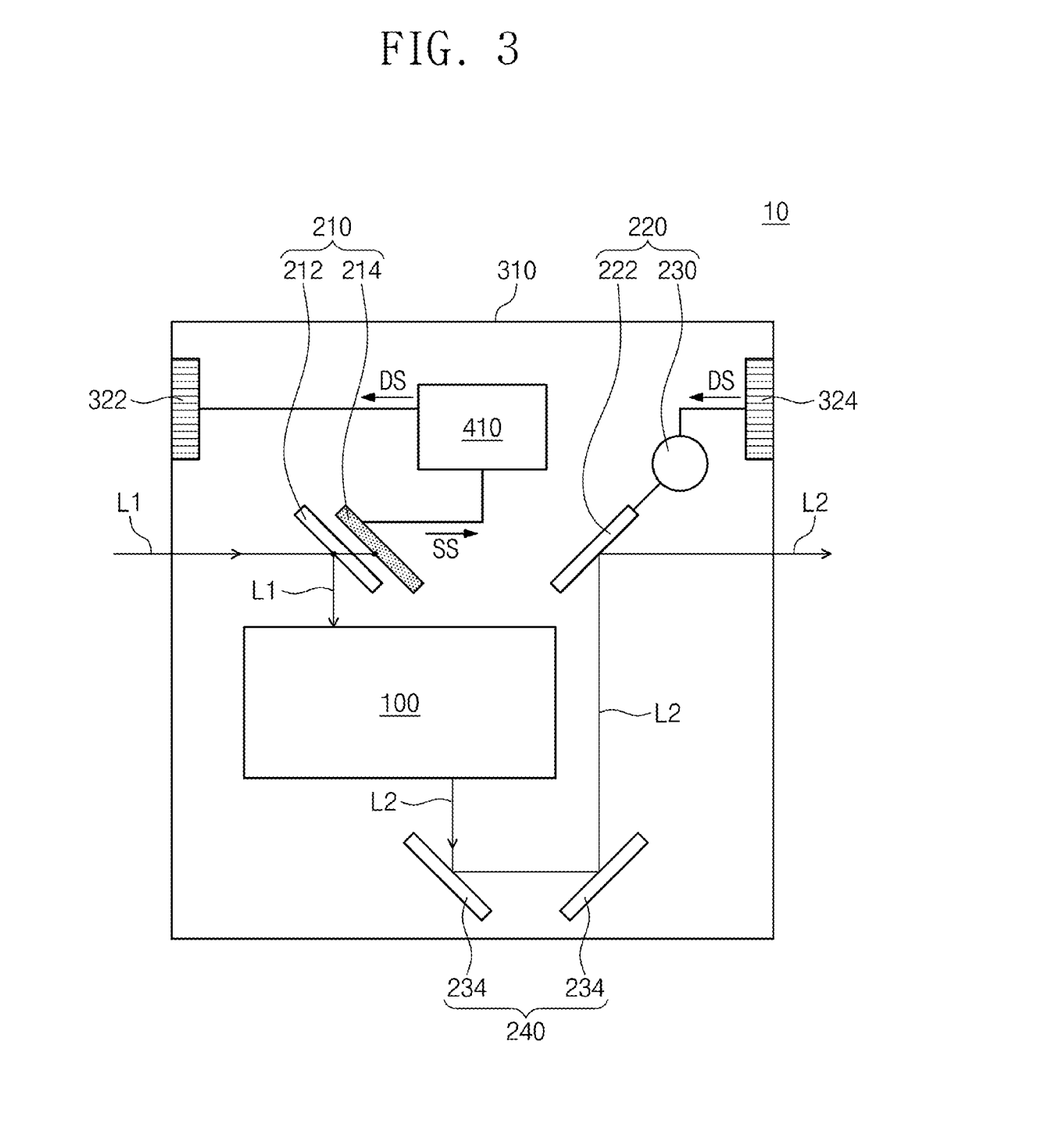
FIG. 3 is a plan view for explaining a laser module according to embodiments of the inventive concept.
Figure 4:
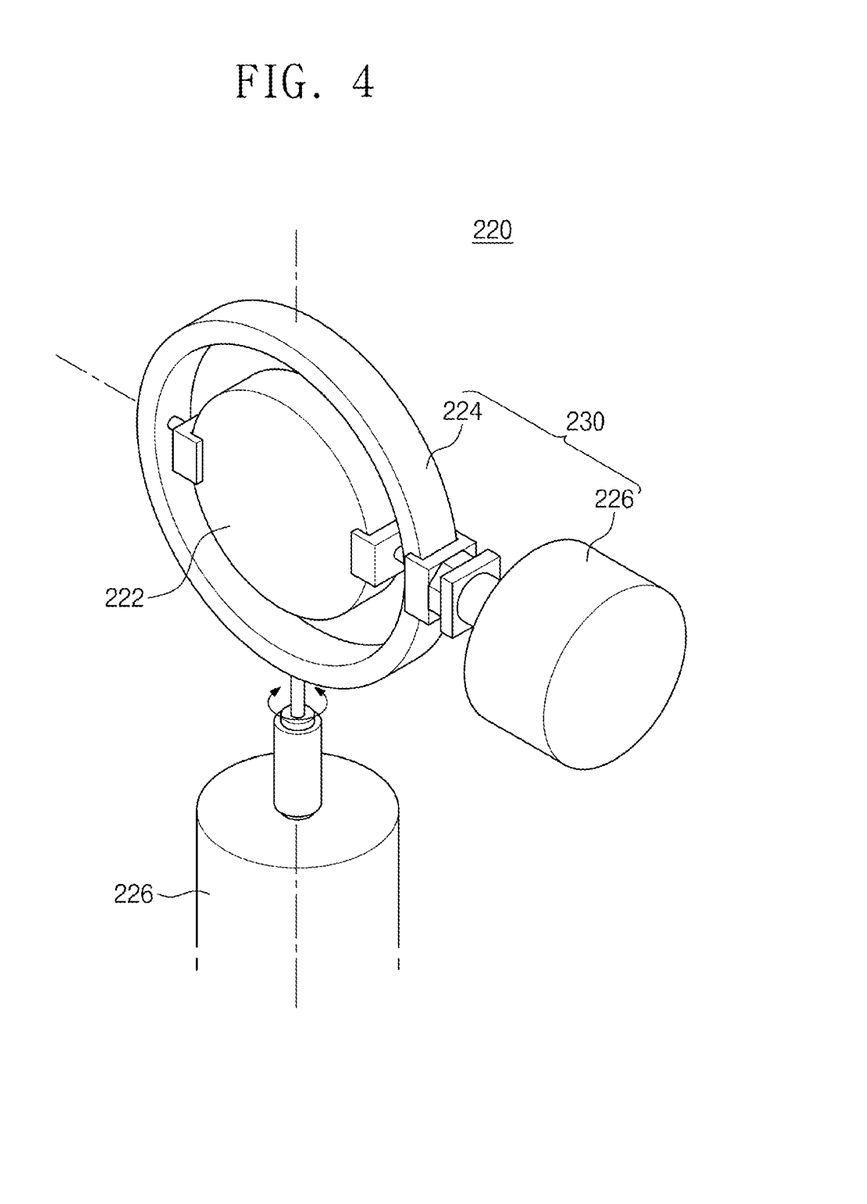
FIG. 4 is a perspective view illustrating a driving mirror unit according to an embodiment of the inventive concept.

FIG. 3 is a plan view for explaining a laser module according to embodiments of the inventive concept. FIG. 4 is a perspective view illustrating a driving mirror unit according to an embodiment of the inventive concept.

In detail, referring to FIG. 3, the laser module 10 according to the embodiments of the inventive concept may include an optical system 100, a driving mirror unit 220, a sensing mirror unit 210, a manual mirror unit 240, and a control unit 410. The sensing mirror unit 210, the optical system 100, the manual mirror unit 240 and the driving mirror unit 220 may be sequentially disposed along the optical path in the laser module 10. The control unit 410 may be connected to the sensing mirror unit 210.

The optical system 100 may include an oscillator 102, a pulse stretcher 120, an amplifier 130 and a pulse compressor 140. The optical system 100 may receive and modulate a first laser beam L1, and then output the modulated result as a second laser beam L2. The second laser beam L2 may be different from the first laser beam L1 in pulse width, pulse spectrum, intensity, or polarization direction. As an example, when the optical system 100 includes the pulse stretcher 120, the first laser beam L1 may have a different pulse width from the second laser beam L2. As another example, when the optical system 100 includes the amplifier 130, the first laser beam L1 may have different intensity from the second laser beam L2.

The sensing mirror unit 210 may reflect the first laser beam L1 incident from the outside of the laser module 10 to provide the reflected first laser beam L1 to the optical system 100. The sensing mirror unit 210 may include a first mirror 212 and a sensor 214 disposed adjacent to the first mirror 212. The sensor 214 may be disposed on the optical path of the first laser beam L1. The first mirror 212 may be a semi-transmissive mirror that reflects a part of incident light and transmits another part thereof. The sensor 214 may be disposed adjacent to the rear surface of the first mirror 212 to sense the first laser beam L1 having transmitted the first mirror 212. The sensor 213 may include a charge-coupled element. The sensor 214 may generate a sensing signal SS including at least one among information on whether the first mirror 212 is irradiated with the first laser beam and information on a position irradiated with the first laser beam L1 on the first mirror 212. The sensor 214 may provide the control unit 410 with the sensing signal SS.

The driving mirror unit 220 may receive, from the optical system 100, and reflect the second laser beam L2 to the outside of the laser module 10. The driving mirror unit 220 may include a second mirror 222 and a driver 230. The second mirror 222 may reflect the second laser beam L2 output from the optical system 100 to the outside of the laser module 10. The driver 230 may be coupled with the second mirror 222 to adjust an angle of the second mirror 222. In detail, referring to FIG. 4, the driver 230 may include a mount 224 that rotatably supports the second mirror 222, and drivers 226 coupled to the mount 224. The mount 224 may hold tight the edge of the second mirror 222. The second mirror 222 may be rotated by the mount 224 in a first direction and a second direction that is perpendicular to the first direction. The driver 226 may apply a rotational force to the mount 224. The driver 226 may include, for example, a motor and a cylinder.

The manual mirror unit 240 may be disposed on the optical path between the optical system 100 and the driving mirror unit 220. The manual mirror unit 240 may receive, from the optical system 100, and reflect the second laser beam L2 towards the driving mirror unit 220. The manual mirror unit 240 may include third mirrors 234. For example, the third mirrors 234 may be fixed to the housing 310 so that the second laser beam L2 output from the optical system 100 has a constant optical path. As another example, the third mirrors 234 may be connected to a screw so that an angle is adjustable for optical alignment.

The control unit 410 may be electrically connected to the sensor 214 of the sensing mirror unit 210. The control unit 410 may include a device capable of processing data like a processor. The control unit 410 may receive the sensing signal SS from the sensor 214 to output a driving signal DS outside the laser module 10. A detailed operation of the control unit 410 will be described specifically below with reference to FIG. 7.

A first terminal 322 connected to the control unit 410 may be provided at one side of the housing 310. The first terminal 322 may deliver the driving signal DS generated in the control unit 410 to an external device connected to the first terminal 322. In addition, a second terminal 324 connected to the driving mirror unit 220 may be provided to the other side of the housing 310. The second terminal 324 may provide, to the driver 230 of the driving mirror unit 220, the driving signal DS output from the external device. Here, the external device connected to the first terminal 322 and the second terminal 324 may be another laser module constituting the laser system together with the laser module 10.

Figure 5:
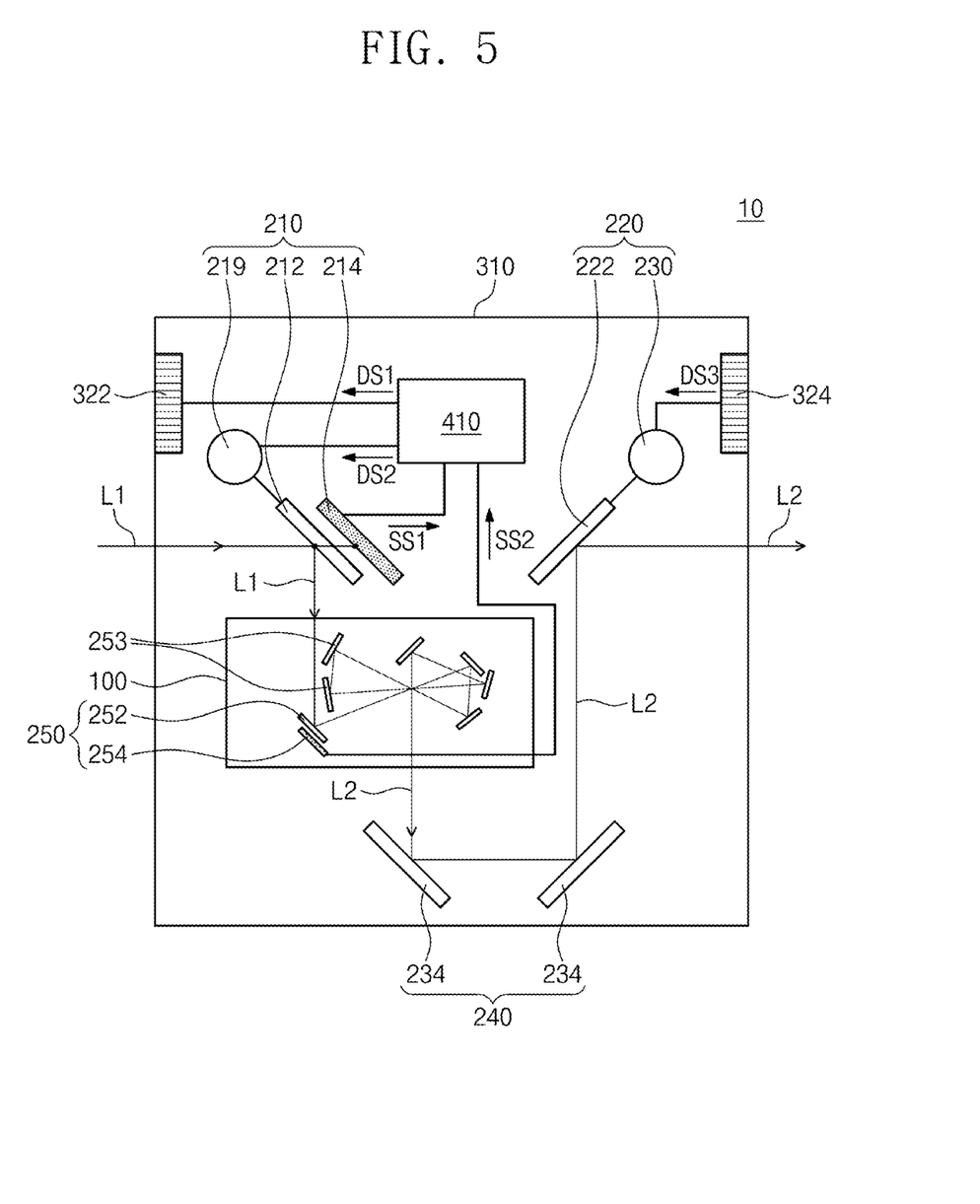
FIGS. 5 and 6 are plan views for explaining a laser module according to embodiments of the inventive concept.
Figure 6:
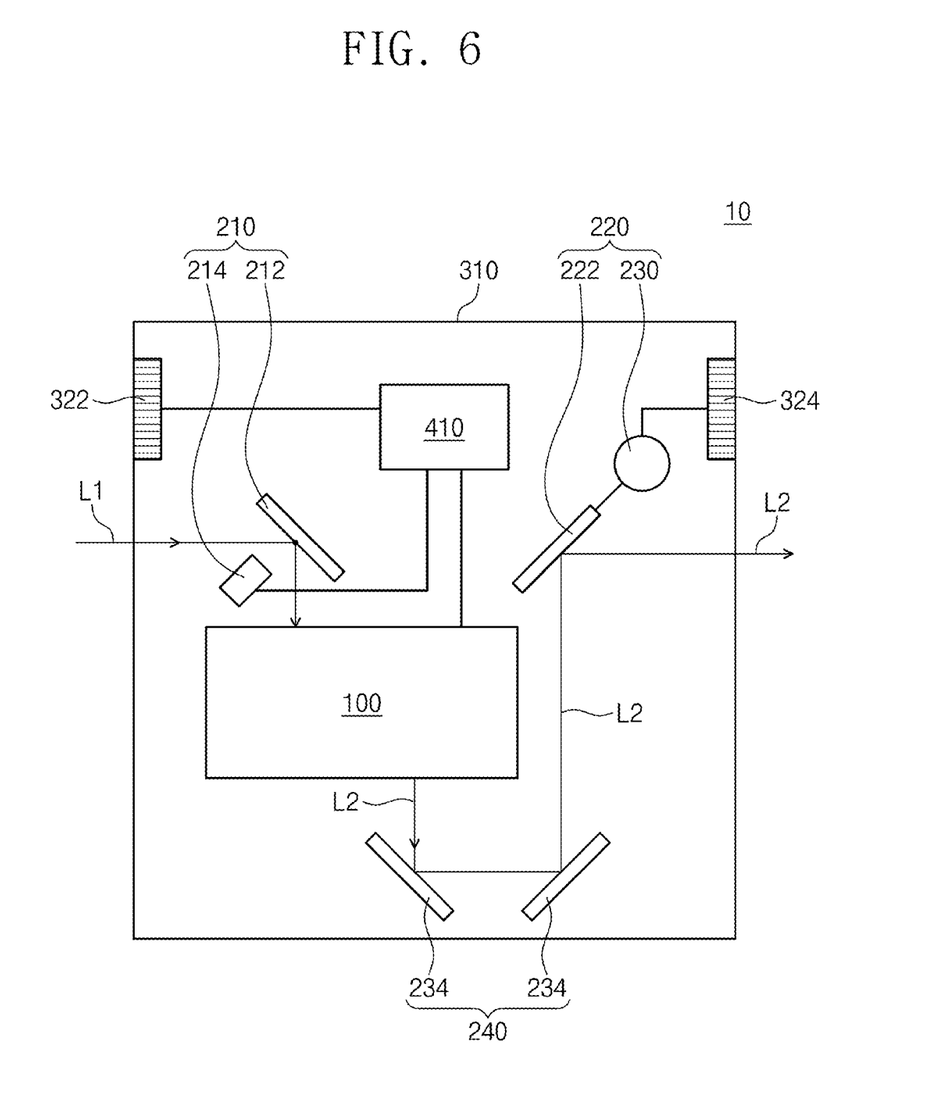

FIGS. 5 and 6 are plan views for explaining a laser module according to embodiments of the inventive concept. Detailed descriptions about components identical or similar to the components of the laser module, which have been described with reference to FIGS. 3 and 4, may be omitted.

With reference to FIG. 5, the laser module 10 may include a second sensing mirror unit 250. The second sensing mirror unit 250 may be connected to the control unit 410. The second sensing mirror unit 250 may include a fourth mirror 252 and a second sensor 254. The fourth mirror 252 may receive the first laser beam L1 to provide optical members 253 in the optical system 100 with the same. The optical members 253 may modulate a laser beam and include, for example, a mirror, a diffraction grating, a gain medium, or the like. The second sensor 254 may be disposed adjacent to the fourth mirror 252 and sense the first laser beam L1 incident to the fourth mirror 252.

In addition, the laser module 10 may include a driver 219 of the sensing mirror unit 210 that is connected to the first mirror 212 to rotate the first mirror 212. The driver 210 of the sensing mirror unit 210 may be connected to the control unit 410 and receive a driving signal DS2 from the control unit 410.

The control unit 410 may receive a sensing signal SS2 from the second sensor 254 to control the driver 210 of the sensing mirror unit 210. For example, the control unit 410 may generate the driving signal DS2 on the basis of the sensing signal SS2, and provide the driver 219 of the sensing mirror unit 210 with the driving signal DS2.

In detail, the sensing signal SS2 may include at least one among information on whether the fourth mirror 252 is irradiated with the first laser beam L1 and information on a position at which the first laser beam L1 is irradiated on the fourth mirror 252. The control unit 410 may control, on the basis of the sensing signal SS2, the driver 219 of the sensing mirror unit 210 so that the first laser beam L1 may be irradiated at a target position of the fourth mirror 252. In other words, the driver 210 of the sensing mirror unit 210 may receive the driving signal DS from the control unit 410 to rotate the fourth mirror 252 by an appropriate angle.

Referring to FIG. 6, the sensor 214 of the sensing mirror unit 210 may not be disposed on the optical path of the first laser beam L1. The sensor 214 may acquire information on a position at which the first laser beam L1 is incident onto the first mirror 212, and include, for example, a camera module.

Figure 7:
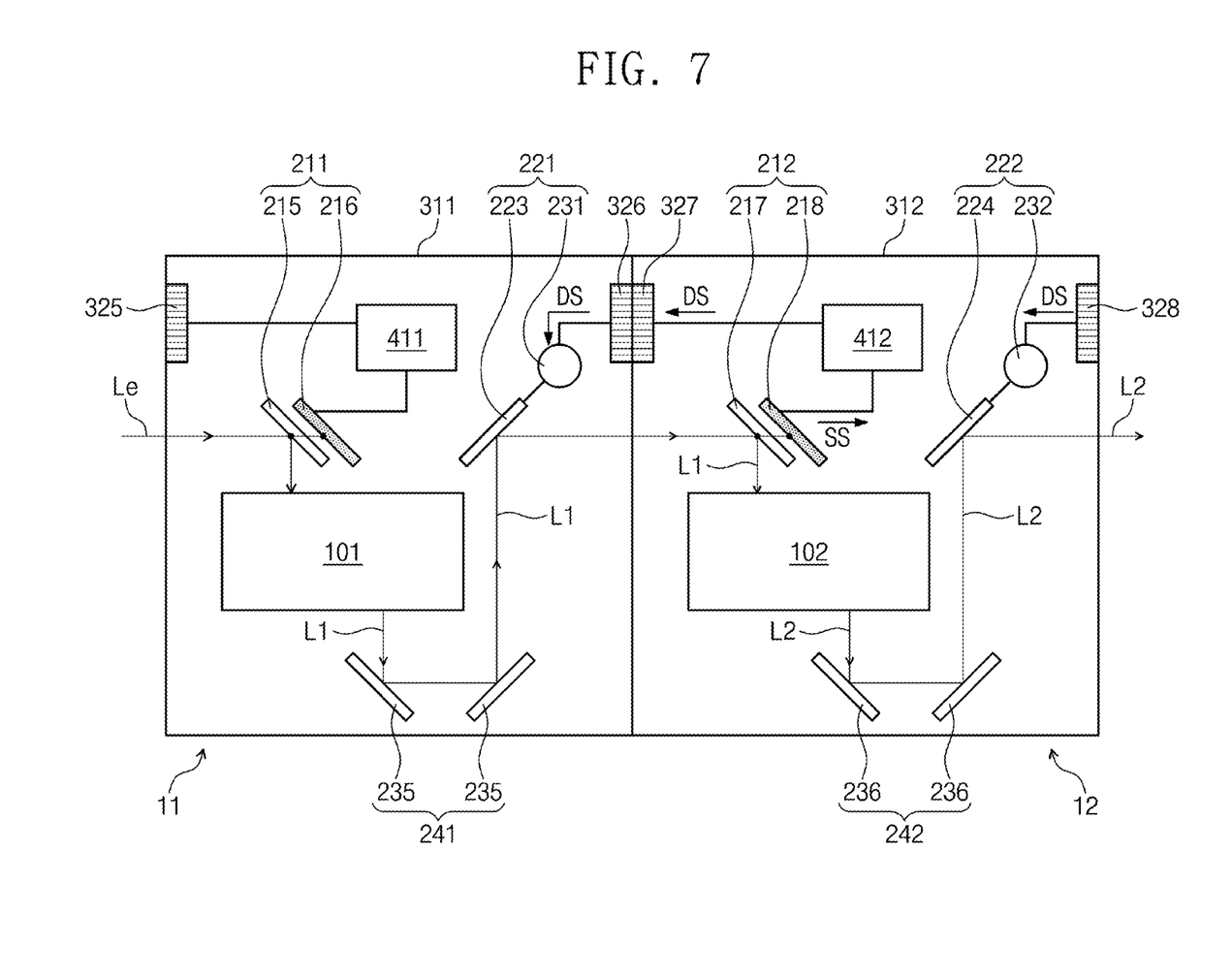
FIGS. 7 to 9 are plan views for explaining a laser system according to embodiments of the inventive concept.
Figure 8:
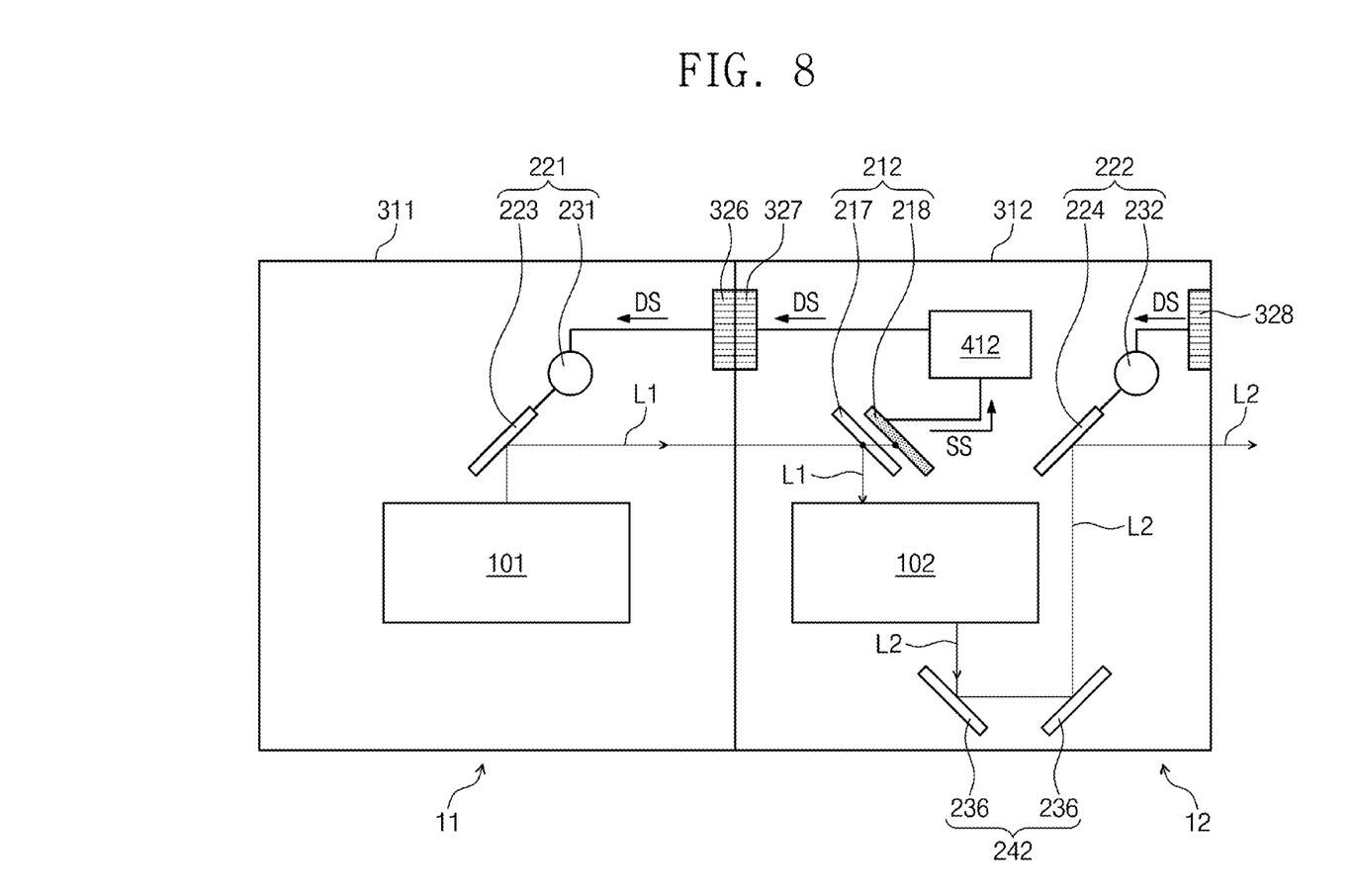
Figure 9:
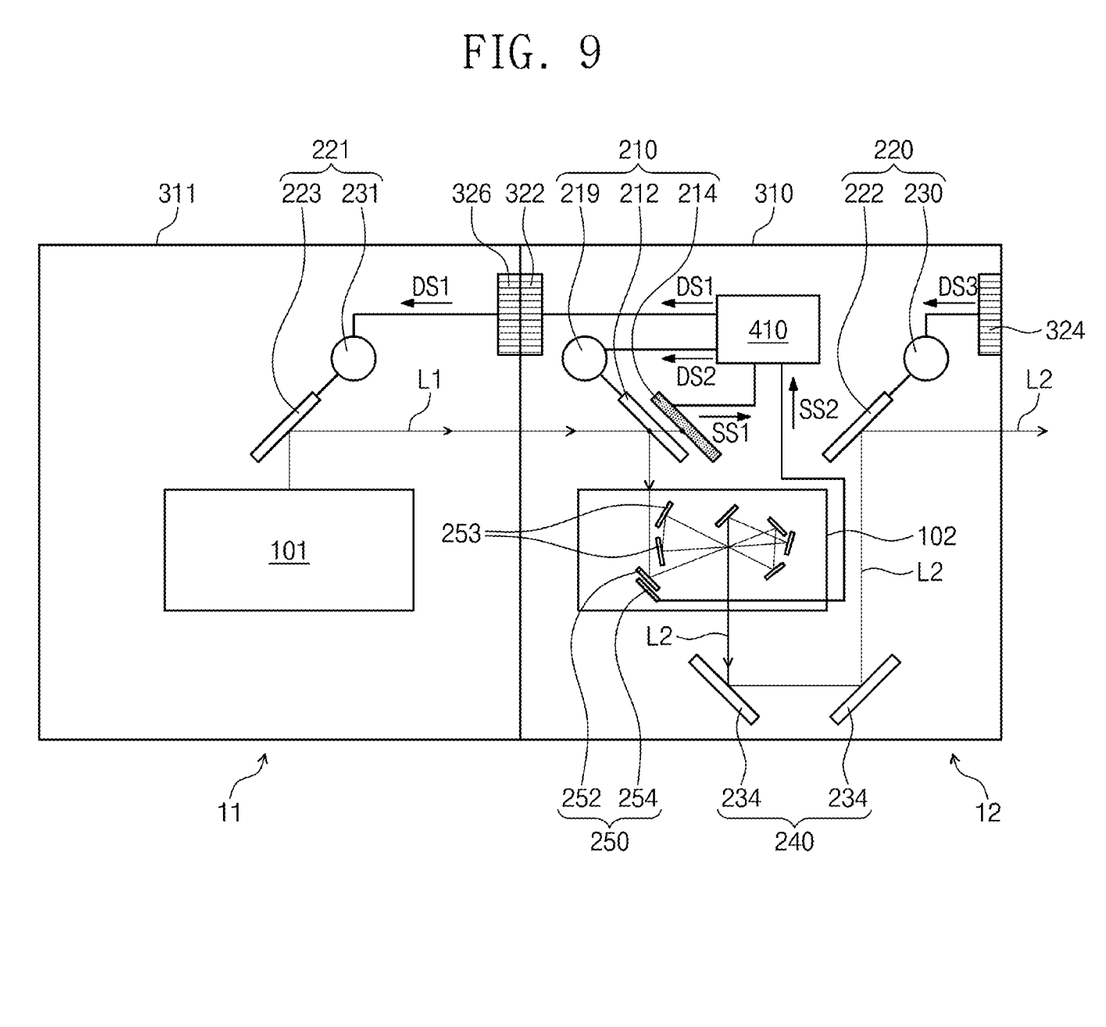

FIGS. 7 to 9 are plan views for explaining a laser system according to embodiments of the inventive concept. Detailed descriptions for components identical or similar to the components that have been described with reference to FIGS. 3 to 6 may be omitted.

Expressions "the first", "the second" or the like in the specification is to distinguish one component from another component. Accordingly, components of the inventive concept are not limited to the above terms. For example, a component previously named as a first component may be renamed again as a second component in describing other embodiments, and a component previously named as a second component may also be renamed as a first component again.

With reference to FIG. 7, a laser system according to embodiments of the inventive concept may include a first laser module 11 and a second laser module 12. The first and second laser modules 11 and 12 may be any two adjacent laser modules in the laser system. The first and second laser modules 11 and 12 may be physically detachably coupled. The first and second laser modules 11 and 12 may be sequentially arrayed along the optical path of a laser beam that travels inside the laser system. Each of the first and second laser modules 11 and 12 may be identical/similar to the laser module 110 having been described with reference to FIG. 3.

The first laser module 11 may include a first optical system 101. The first optical system 101 may include, for example, one among the pulse stretcher 120, the amplifier 130, or the pulse compressor 140 having been described with reference to FIG. 1.

The first optical system 101 may receive an external laser beam Le from the outside of the first laser module 11. The external laser beam Le may be, for example, a laser beam generated by another laser module in the laser system. The other laser module may be a laser module disposed before the first laser module 11 on the basis of the optical path. The first optical system 101 may modulate the external laser beam Le to output the modulated result as the first laser beam L1.

The first sensing mirror unit 211 may be disposed before the first optical system 101 on the optical path in the first laser module 11. The first sensing mirror unit 211 may include a first mirror 215 and the first sensor 216 disposed adjacent to the first mirror 215. The first sensing mirror unit 211 may reflect the external laser beam Le towards the first optical system 101.

A first driving mirror unit 221 may be disposed behind the first optical system 101 on the optical path in the first laser module 11. The first driving mirror unit 221 may reflect the first laser beam L1 towards the second laser module 12. The first driving mirror unit 221 may include a second mirror 223 and a first driver 231.

A first manual mirror unit 241 may be disposed on the optical path between the first optical system 101 and the first driving mirror unit 241. The first manual mirror unit 241 may reflect the first laser beam L1 output from the first optical system 101 towards the first driving mirror unit 241.

The first laser module 11 may include first and second terminals 325 and 326 coupled to one side and the other side of a first housing 311. A first control unit 411 may be connected to the first sensing mirror unit 211 and the first terminal 325.

The second laser module 12 may include a second optical system 102. The second optical system 102 may include, for example, one among the pulse stretcher 120, the amplifier 130 and the pulse compressor 140 having been described with reference to FIG. 1.

The second sensing mirror unit 212 may be disposed before the second optical system 102 on the optical path in the second laser module 12. The second sensing mirror unit 212 may include a third mirror 217 and a second sensor 218 disposed adjacent to the third mirror 217. The second sensing mirror unit 212 may reflect the first laser beam L1 towards the second optical system 102.

The second driving mirror unit 222 may be disposed behind the second optical system 102 on the optical path in the second laser module 12. The second driving mirror unit 222 may reflect the second laser beam L2 towards the outside of the second laser module 12. The second driving mirror unit 222 may include a fourth mirror 224 and a second driver 232.

The second manual mirror unit 242 may be disposed on the optical path between the second optical system 102 and the second driving mirror unit 222. The second manual mirror unit 242 may reflect the second laser beam L2 output from the second optical system 102 towards the second driving mirror unit 222.

The second laser module 12 may include third and fourth terminals 327 and 328 coupled one side and the other side of the second housing 312. A second control unit 412 may be connected to the second sensing mirror unit 212 and the third terminal 327.

The second control unit 412 may receive a sensing signal SS from the second sensing mirror unit 212. The second control unit 412 may generate a driving signal DS on the basis of the sensing signal SS to provide the first driver 231 of the first laser module 11 with the driving signal DS.

In detail, the sensing signal SS may include at least one among information whether the third mirror 217 is irradiated with the first laser beam L1 and information on a position at which the first laser beam L1 is irradiated on the first third mirror 217. The second control unit 412 may control the first driver 231 on the basis of the sensing signal SS so that a target position on the third mirror 217 is irradiated with the first laser beam L1. In other words, the first driver 231 may receive the driving signal DS from the second control unit 312 to rotate the second mirror 223 by an appropriate angle. For example, when the third mirror 217 is not irradiated with the first laser beam L1, the second control unit 412 may provide the first driver 231 with the driving signal DS to rotate the second mirror 223 so that the third mirror 217 is irradiated with the first laser beam L1. When the target position of the third mirror 217 is irradiated with the first laser beam L1 during the rotation of the second mirror 223, the second control unit 402 may provide the first driver 231 with the driving signal DS to stop the rotation of the third mirror 217.

Referring to FIG. 8, the first laser module 11 may directly generate the first laser beam L1 without receiving an external laser beam. The first optical system 101 may include the oscillator having been described with reference to FIG. 1, and oscillate the first laser beam L1. The first laser beam L1 generated from the first laser module 11 may be reflected by the first driving mirror unit 221 to be provided to the second laser module 12. The first laser beam L1 may not include the first terminal 325 and the control unit 411 having been described with reference to FIG. 7.

Referring to FIG. 9, the second laser module 12 may include a first sensing mirror unit 210 and a second sensing mirror unit 250. The first sensing mirror unit 210 may include a first mirror 212, a first sensor 214 and a driver 219 disposed adjacent to the first mirror 212. The second sensing mirror unit 250 may include a second mirror 242 and a second sensor 254 disposed adjacent to the second mirror 252. The first sensor 214, the driver 219 and the second sensor 252 may be connected to the control unit 410.

The first optical system 101 in the first laser module 11 may output the first laser beam L1. The first laser beam L1 may be reflected by the first driving mirror unit 221 to be provided to the first sensing mirror unit 210 in the second laser module 12.

The first sensing mirror unit 210 may generate a first sensing signal SS1 including at least one among information on whether the first mirror 212 is irradiated with the first laser beam L1 and information on a position at which the first laser beam L1 is irradiated on the first mirror 212. The first sensing mirror unit 210 may provide the control unit 410 with the first sensing signal SS1.

The control unit 410 may be connected to the first driving mirror unit 221 in the first laser module 11 through terminals 326 and 322 formed at one sides of the first and second laser modules 11 and 12. The control unit 410 may generate a first driving signal DS1 on the basis of the first sensing signal SS1 and, through this, control the driver 231 of the first driving mirror unit 221. The driver 231 may be feedback-controlled by the control unit 410 so that the first laser beam L1 may be focused onto a target position on the first mirror 212.

The first laser beam L1 reflected by the first mirror 212 may be provided to the second optical system 102 in the second laser module 12. Here, the second sensing mirror unit 210 may be provided between optical members 253 in the second optical system 102 and the first sensing mirror unit 210. The second sensing mirror unit 210 may improve precision in optical alignment in the laser system by correcting an error that may occur by a change in incident angle of the first laser beams L1 incident to the first mirror 212.

In detail, the second sensing mirror unit 210 may receive the first laser beam L1 reflected by the first mirror 212 to generate a second sensing signal SS2. The second sensing signal SS2 may include at least one among information on whether the second mirror 252 is irradiated with the first laser beam L1 and information on a position at which the first laser beam L1 is irradiated on the second mirror 252.

The control unit 410 may receive the second sensing signal SS2 from the second sensing mirror unit 210 to generate the second driving signal DS2. The control unit 410 may control the driver 219 of the first sensing mirror unit 210 through the second driving signal DS2. The control unit 410 may feedback-control the driver 219 to focus the first laser beam L1 onto a target position on the second mirror 252. As the first laser beam L1 is focused onto both the target position on the first mirror 212 and the target position on the second mirror 252, precise optical alignment may be accomplished without an alignment error.

According to embodiments of the inventive concept, a laser module and a laser system for which management is convenient and in which optical alignment is facilitated may be provided. Furthermore, when the laser module includes a plurality of sensing mirror units, an arrangement error that may be generated by a change in incident angle or the like of the laser beam may be further reduced.

The exemplary embodiments of the present disclosure have been described above with reference to the accompanying drawings, but those skilled in the art will understand that the present disclosure may be implemented in another concrete form without changing the technical spirit or an essential feature thereof. Therefore, the aforementioned exemplary embodiments are all illustrative and are not restricted to a limited form. Therefore, these embodiments as described above are only proposed for illustrative purposes and do not limit the present disclosure.

What is claimed is:

1. A laser module, which receives a first laser beam and outputs a second laser beam different from the first laser beam, the laser module comprising:
    an optical system configured to modulate the first laser beam into the second laser beam and output the second laser beam;
    a first mirror disposed on an optical path of the first laser beam defined in the laser module, the first mirror reflecting the first laser beam to the optical system;
    a first sensor disposed adjacent to the first mirror and configured to sense a position corresponding to where the first laser beam is incident to the first mirror;
    a second mirror disposed on the optical path to reflect the second laser beam to an outside of the laser module;
    a first driver connected to the second mirror and configured to rotate the second mirror, and
    a second driver connected to the first mirror and configured to rotate the first mirror.

2. The laser module of claim 1, wherein the optical system includes at least one among a pulse stretcher, an amplifier, or a pulse compressor.

3. The laser module of claim 1, wherein the second laser beam is different from the first laser module in at least one among a pulse width, a pulse spectrum, intensity, or a polarization direction.

4. The laser module of claim 1, further comprising:
    a control unit connected to the first sensor and configured to receive a sensing signal for the first laser beam from the first sensor to generate a driving signal.

5. A laser module of claim 4, further comprising:
    a first terminal connected to the control unit; and
    a second terminal connected to the first driver.

6. The laser module of claim 1, wherein the first mirror includes a semi-transmissive mirror, and
    the first sensor includes a charge-coupled element configured to sense a portion of the first laser beam penetrating through the first mirror.

7. The laser module of claim 1, further comprising:
    a third mirror disposed behind the first mirror on the optical path; and
    a second sensor disposed adjacent to the third mirror to sense the first laser beam incident to the third mirror.

8. The laser module of claim 1, further comprising:
    a third mirror disposed behind the first mirror on the optical path;
    a second sensor disposed adjacent to the third mirror and configured to sense the first laser beam incident to the third mirror; and
    a control unit configured to receive a sensing signal for the first laser beam from the second sensor and provide the second driver with a driving signal.

9. A laser system comprising:
    a first laser module; and
    a second laser module configured to receive a laser beam from the first laser module,
    wherein the first laser module comprises:
        a first optical system configured to output a first laser beam;
        a first mirror configured to reflect the first laser beam to the second laser module; and
        a first driver coupled to the first mirror so as to rotate the first mirror, and
    wherein the second laser module comprises:
        a second optical system configured to receive the first laser beam and output a second laser beam different from the first laser beam;
        a second mirror configured to reflect the first laser beam towards the second optical system; and
        a sensor disposed adjacent to the second mirror and configured to sense a position corresponding to where the second laser beam is incident to the second mirror.

10. The laser system of claim 9, wherein the second laser module further comprises a control unit connected to the sensor and the first driver.

11. The laser system of claim 10, wherein the control unit is configured to receive a sensing signal for the first laser beam from the sensor to thereby provide the first driver with a driving signal.

12. The laser system of claim 11, wherein the sensing signal includes at least one among information on whether the second mirror is irradiated with the first laser beam and information on a position at which the first laser beam is irradiated on a third mirror.

13. The laser system of claim 9, wherein the first optical system includes at least one among an oscillator, a pulse stretcher, an amplifier, or a pulse compressor.

14. The laser system of claim 9, wherein the second laser beam is different from the first laser beam in at least one among a pulse width, a pulse spectrum, intensity or a polarization direction.

15. The laser system of claim 9, wherein the second laser module includes a third mirror configured to reflect the second laser beam to an outside of the second module and a second driver coupled to the third mirror so as to rotate the third mirror.

16. The laser system of claim 9, wherein the second mirror includes a semi-transmissive mirror, and the sensor includes a charge-coupled element configured to sense the first laser beam penetrating through the second mirror.

17. The laser system of claim 9, wherein the first laser module includes a first terminal connected to the first driver,
the second laser module includes a control unit connected to the first driver and a second terminal connected to the control unit, and
the first terminal and the second terminal are connected to each other so as to connect the control unit and the first driver.

18. The laser module of claim 1, wherein the first sensor includes a camera module disposed to view a front surface of the first mirror.

* * * * *